(12) United States Patent
Kamo

(10) Patent No.: US 6,487,238 B1
(45) Date of Patent: Nov. 26, 2002

(54) SIGNAL RECEIVING DEVICE AND RADIO TRANSMISSION DEVICE AND RADIO TRANSMISSION METHOD

(75) Inventor: Takanobu Kamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,343

(22) Filed: Jun. 25, 1999

(30) Foreign Application Priority Data

Jun. 26, 1998 (JP) ............................................. 10-180972

(51) Int. Cl.[7] .............................................. H04B 1/707
(52) U.S. Cl. ........................ 375/150; 375/152; 375/367
(58) Field of Search ................................. 375/130, 142, 375/143, 150, 152, 364, 365, 367

(56) References Cited

U.S. PATENT DOCUMENTS 5,442,646 A * 8/1995 Chadwick et al. .......... 375/296
5,754,605 A * 5/1998 Chong et al. ............... 370/514
6,313,885 B1 * 11/2001 Patel et al. ................. 348/614

* cited by examiner

Primary Examiner—Don N. Vo
(74) Attorney, Agent, or Firm—Jay H. Maioli

(57) ABSTRACT

A signal receiving device, and a radio transmission device and radio transmission method utilized a code sequence extracting circuit for receiving transmission data that is information data to be transmitted having a code sequence of a fixed bit length, formed based on prescribed identification data, and for extracting the code sequence from said transmission data received, a comparison circuits for comparing the code sequence previously allocated to the receiving side with the code sequence of the transmission data extracted by the code sequence extracting circuit, and a control unit for conducting control based on the information data of the transmission data when the comparison result of said comparison circuit shows identity.

3 Claims, 5 Drawing Sheets

TRANSMISSION PACKET DATA D3

| PN1 | CODED DATA D2 |

| COUNTER | PN OUTPUT |
|---|---|
| 1 | 1 |
| 2 | 1 |
| 3 | 1 |
| 4 | 1 |
| 5 | 0 |
| 6 | 1 |
| 7 | 0 |
| 8 | 1 |
| 9 | 1 |
| 10 | 0 |
| 11 | 0 |
| 12 | 1 |
| 13 | 0 |
| 14 | 0 |
| 15 | 0 |

} PN CODE OF 15 BITS PER CYCLE

SIGNAL RECEIVING DEVICE AND RADIO TRANSMISSION DEVICE AND RADIO TRANSMISSION METHOD

BACKGROUND OF THE INVENTION

1. Field of the Invention

This present invention relates to a signal receiving device, and a radio transmission device and a radio transmission method, and more particularly, is suitably applied to the radio network system that realizes data communications between electronic devices which are connected by radio waves in the house.

2. Description of the Related Art

The radio network system constructing the radio local area network (LAN) system by connecting electronic devices, such as televisions (hereinafter referred to as TV), video tape recorders (hereinafter referred to as VTR) and a personal computer used in a house, has begun to be popular.

In such a radio network system, a VTR is set as a host device and a personal computer and TV are set as non-host devices. These non-host devices such as the personal computer and TV are installed at the optional positions each being a fixed distance from the host device VTR, and data can be transmitted by radio to the host device equipped with a transceiver from a transceiver provided in each non-host device.

Accordingly, in the radio network system, in the case of sending and receiving transmission data between the electronic devices, the receiving side receives the transmission data only when the receiving side recognizes the other party's electronic device.

Thus, in the case of conducting recognizing between electronic devices, it is common that its reliability is made higher by using encryption, and the transmission message is encrypted by a secret key and transmitted. More specifically, the electronic devices exchanging the transmission data each other have the common secret key, and when one device receives the transmission data, the device executes recognizing by conducting the arithmetic operation by decipher algorithm using the secret key. And then, the transmission message can be obtained by separating the secret key and the transmission message.

However, in the radio network system thus constructed, in the case of conducting recognizing, the complicated arithmetic operation should be conducted with the decipher algorithm, and it caused the problem that the circuit construction became complicated and large in size.

Furthermore, export controls are imposed on the encryption itself and in the case of producing products considering its expansion on the world market, it is difficult to adopt the common encryption standards in the whole world. And since it is sufficiently considered that each country should adopt its own encryption standard, the encryption standards should be changed depending on the country at the manufacturing stage and thus, it caused the problem in increasing and complicating the manufacturing process.

Furthermore, in a state where the radio network system is constructed in the house and an identical radio network system is constructed in the neighboring house, it has the possibility of interference between these systems and of tapping when interference occurs and thus, it caused the infringement of privacy.

SUMMARY OF THE INVENTION

In view of he foregoing, an object of this invention is to provide a signal receiving device, a radio transmission device and a radio transmission method capable of executing recognizing safely, certainly and quickly with a simple construction and method.

The foregoing object and other objects of the invention have been achieved by the provision of a signal receiving device, a radio transmission device and radio transmission method. And we provide a code sequence extracting means for receiving transmission data that is information data to be transmitted having code sequence of the fixed bit length, formed based on the prescribed identification data, added and for extracting the code sequence from said received transmission data, a comparison means for comparing the code sequence previously allocated to the receiving side to the code sequence of the transmission data extracted by the code sequence extracting means, and a control means for executing control based on the information data of the transmission data when the comparison result of said comparison means shows conformity.

By comparing the code sequence of the transmission data received to the code sequence previously allocated to the receiving side and recognizing the desired transmission data to be received when the comparison result shows identity, the recognizing can be conducted certainly and quickly by the simple processing just to compare and simultaneously, when identity is showed, the control based on the information data of the transmission data can be executed.

Furthermore, this present invention provides the radio transmission device for conducting data transmission between electronic devices by connecting a plurality of electronic devices by radio. Each of the plurality of electronic devices comprises a code sequence adding means for forming a code sequence having a fixed bit length based on prescribed identification data and for adding the code sequence to information data to be transmitted, a transmission means for transmitting the transmission data that is the information data having the code sequence added, to a plurality of electronic devices, a code sequence extracting means for extracting the code sequence from the data received through the signal receiving means, a comparison means for comparing the code sequence previously allocated to the receiving side to the code sequence of the received data extracted by the code sequence extracting means, and a control means for recognizing the received data as the transmission data transmitted from any one of the plurality of electronic devices when the comparison result of the comparison means shows identity and for executing control based on the information data of the transmission data.

Each electronic device transmits the transmission data that is information data to be transmitted having the code sequence of the fixed bit length, formed based on the prescribed identification data, added, to a plurality of electronic devices, compares the code sequence extracted from the data received through the signal receiving means to the code sequence previously allocated to the receiving side, and when the comparison result shows identity, recognizes that the received data is the transmission data transmitted from any one of the plurality of electronic devices, so that recognizing can be conducted certainly and quickly by the simple processing just to compare and control based on the information data of the transmission data can be conducted only when identity is showed.

Furthermore, the present invention provides the radio transmission method of conducting data transmission between the electronic devices by connecting the plurality of electronic devices to each other by radio. Each of these plurality of electronic devices adds the code sequence with the fixed bit length formed based on the prescribed identification data to the information data to be transmitted, transmits the transmission data that is the information data having the code sequence added, to a plurality of electronic devices, extracts the code sequence from the data received through the signal receiving means, compares the code sequence previously allocated to the receiving side to the code sequence of the received data extracted, recognizes that the received data is transmitted from any one of the plurality of electronic devices when the comparison result shows identity, and executes control based on the information data of the transmission data.

Each of the plurality of electronic devices transmits the transmission data that is information data to be transmitted having the code sequence of the fixed bit length, formed based on the prescribed identification data, added, to the plurality of electronic devices, compares the code sequence extracted from the data received through the signal receiving means to the code sequence previously allocated to the receiving side, and recognizes that the received data is the transmission data transmitted from any one of the plurality of electronic devices when the comparison result shows identity, so that recognition can be conducted certainly and quickly with the simple processing just to compare and only when identity is showed, control based on the information data of the transmission data can be executed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
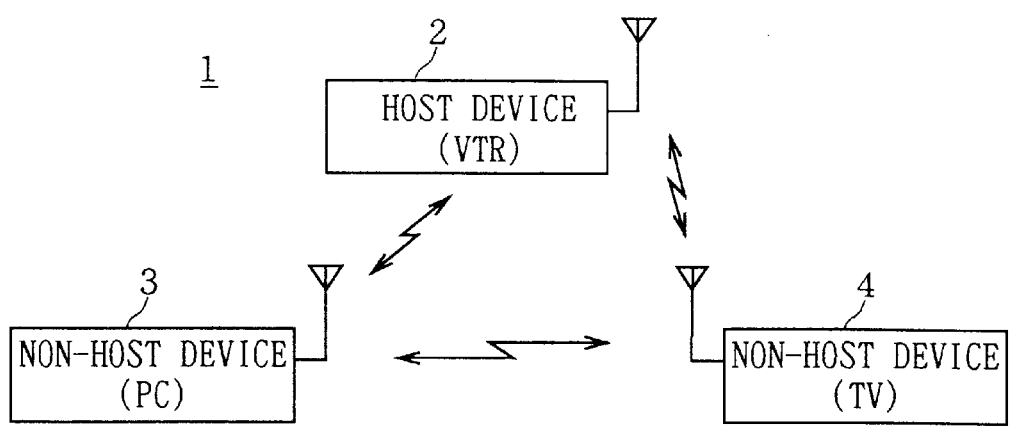
FIG. 1 is a block diagram showing the construction of a radio transmission system according to the embodiment of the present invention.

Preferred embodiments of this invention will be described with reference to the accompanying drawings:

In FIG. 1, 1 generally shows a radio transmission system according to the present invention. A VTR for mainly receiving transmission data is provided as the host device and a personal computer and a TV are set as the non-host devices 3 and 4. These non-host devices 3 and 4 are placed at the optional positions each being a fixed distance from the host device 2 and the non-host devices equipped with transceivers (not shown in FIG. 1) can transmit data by radio to the host device 2 equipped with the similar transceiver (not shown in FIG. 1) using their transceivers.

Then, the circuit configuration of the transceivers provided in the host device 2, non-host devices 3 and 4 respectively will be described. In this case, since these transceivers are identical, only the transceiver mounted in the host device 2 will be described and other transceivers mounted in the non-host devices 3 and 4 will be omitted.

Figure 2:
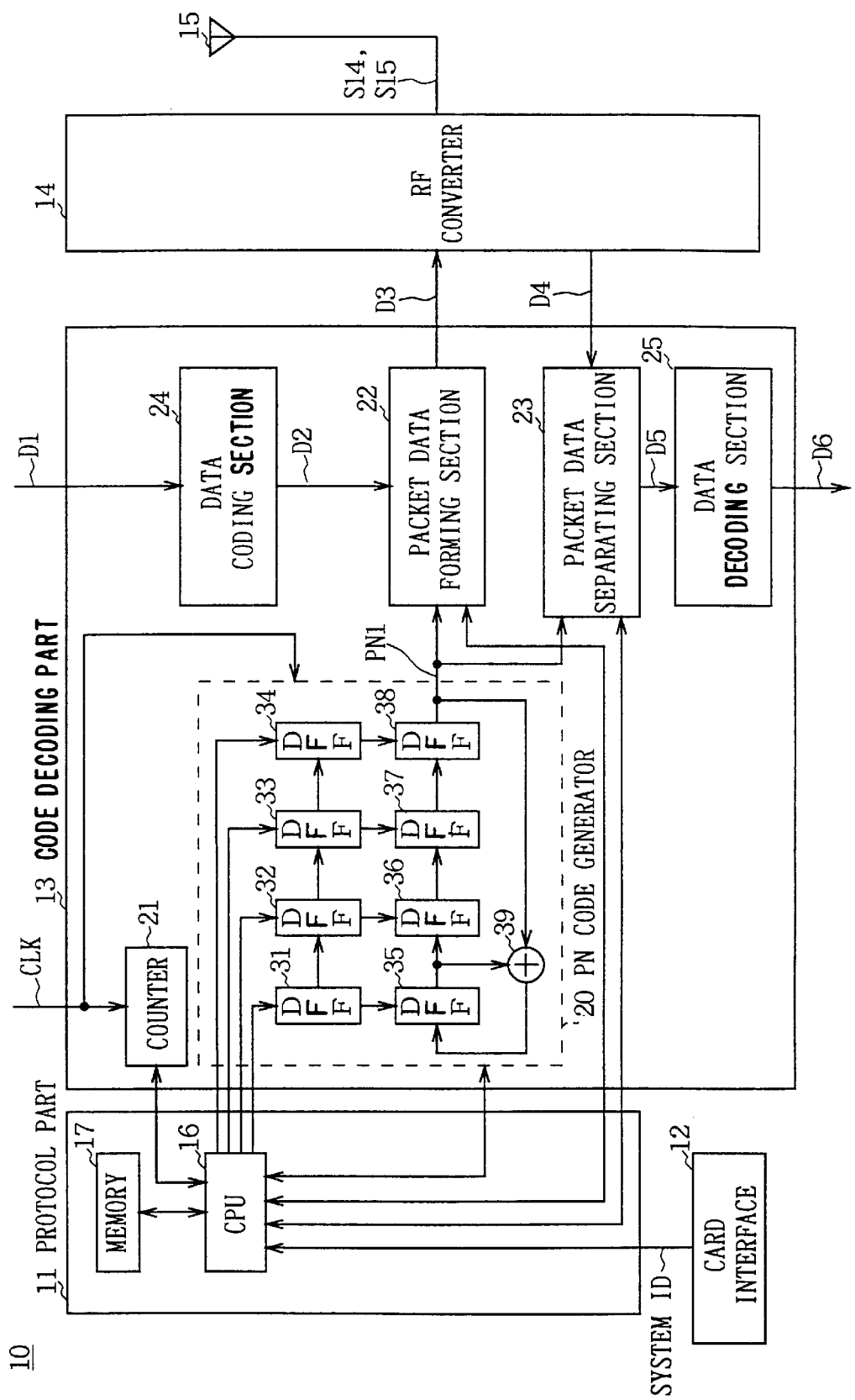
FIG. 2 is a block diagram showing the circuit construction of a transceiver.

As shown in FIG. 2, the transceiver 10 comprises a protocol part 11, a card interface 12, a code decoding part 13, a RF (Radio Frequency) converter 14, and an antenna 15. A central processing unit (CPU) 16 in the protocol part 11 reads out the system identification (ID) of the radio transmission system 1 recorded on the integrated circuit (IC) card from the IC card (not shown in FIG. 2) connected to the card interface 12 and makes the memory 17 memorize this.

At this point, the system ID recorded on the IC card is the system-specific ID number of the radio transmission system 1, and the bit data consisting of four bits to be used commonly among the host device 2 and non-host devices 3 and 4. Accordingly, the CPU 16, after reading out the system ID of four bits as the parallel data and temporarily storing this in the memory 17, reads it out and transmits the 4-bit system ID to a pseudo random noise sequence (PN) code generator 20 of the code decoding part 13 as the parallel data.

The PN code generator 20 in the code decoding part 13 comprises four stages of delay flip-flops (DFFs) 31 to 34 for temporarily storing the 4-bit system ID as an initial value, four stages of delay flip-flops (DFFs) 35 to 38 for generating fourth PN code PN1, i.e., a M-sequence code that is a pseudo random noise sequence code having 15 bits per cycle, based on the 4-bit system ID stored in the DFFs 31 to 34, and an exclusive OR circuit (EXOR circuit) 39.

When the 4-bit system ID transmitted from the CPU 16 is such as "1, 1, 1, 1", this PN code generator 20 stores this system ID in the DDFs 31 to 34 as it is as the initial value. Thus, the radio transmission system 1 executes the process till the 4-bit system ID is stored as the initial value in the DFFs 31 to 34 by the CPU 16 of the protocol part 11, as the initial setting in the host device 2 and non-host devices 3 and 4.

Then, the PN code generator 20 transfers 4-bit system ID stored in the DFFs 31 to 34 to the DFFs 35 to 38 when desired data is required to be transmitted. And the PN code generator 20, sequentially shifting the bit data stored in the DFFs 35 to 38 at the timing synchronized with the reference clock CLK, sequentially transmits PN code PN1 one bit by one bit by applying the exclusive OR arithmetic operation at the EXOR circuit 39.

At this point, the code decoding part 13 counts the number of shifts of the PN code generator 20 by a counter 21 having 4-bit structure that operates under the control of CPU 16 up to the maximum of fifteen times based on the reference clock CLK. When the counter 21 counts the number of shifts of the PN code generator 20 up to the maximum of fifteen times, the CPU 16 resets the count value of the counter 21 and identifies that the fourth PN code PN1 has been outputted to a packet data forming section 22 from the PN code generator 20.

Figures 3, 4:
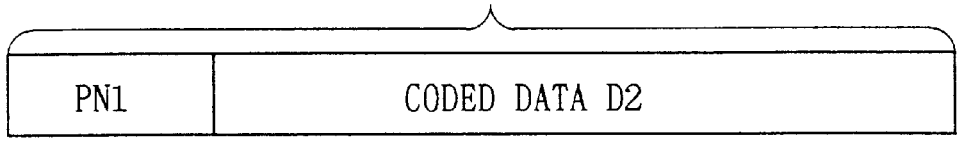
FIG. 3 is a brief linear diagram showing the construction of transmission packet data.
FIG. 4 is a brief linear diagram showing the output table of a PN code generator.

In this connection, the counter 21, by outputting one bit every counting-up, fifteen times, as shown in an output table of FIG. 4, generates the PN code PN1 of fifteen bits per cycle.

On the other hand, the code decoding part 13 inputs the transmission data D1 to be transmitted to a data coding section 24. The data coding section 24 forms coded data D2 by coding the transmission data D1 with the prescribed system and transmits this to the packet data forming section 22.

The packet data forming section 22, as shown in FIG. 3, forms transmission packet data D3 by adding the PN code PN1 to the head of the coded data D2 based on the control of CPU 16 and sends this out to the RF converter 14.

The RF converter 14 converts the transmission packet data D3 into an analog signal, and after converting the frequency of the analog transmission signal into the prescribed frequency band, forms a transmission signal S14 by amplifying this to the prescribed power level and transmits this via the antenna 15.

On the other hand, the transceiver 10, receiving data, inputs the signal S15 received to the RF converter 14 via the antenna 15. The RF converter 14, after amplifying the received signal S15 to the prescribed power level, takes out a baseband signal by applying the frequency conversion processing, and converting this into a digital signal, obtains the received packet data D4 and transmits this to the packet data separating section 23.

The packet data separating section 23 compares the PN code PN supplied from the PN code generator 20 with the PN code added to the head of the received packet data D4. When these bit data match, it certifies that the data are transmitted from the non-host device 3 or 4 in the same system, and at this point, separating the received packet data D4 into the PN code PN1 and the coded data D5 for the first time and transmits only the coded data D5 to a data decoding section 25. The data decoding section 25 forms decoded data D6 by decoding the coded data D5 and outputs this.

Figure 5:
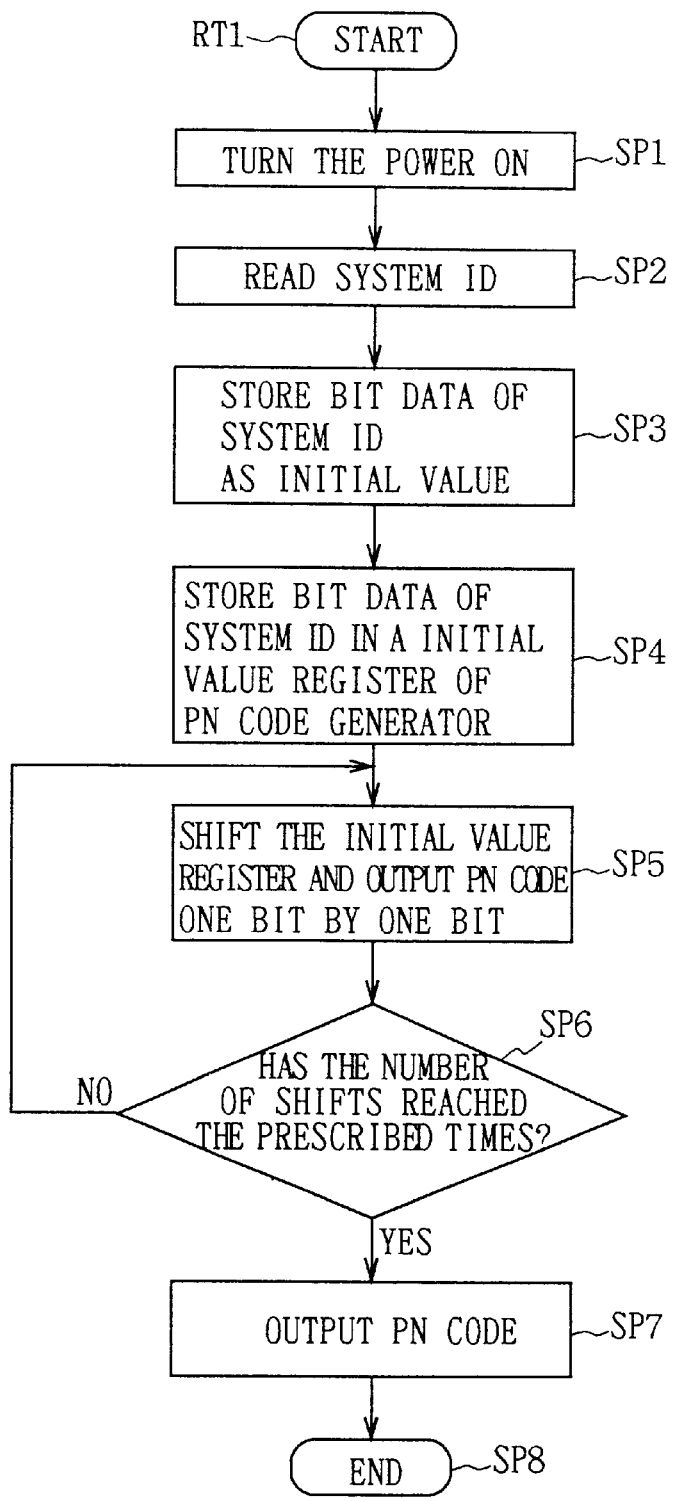
FIG. 5 is a flowchart showing the PN code forming processing procedure.

Then, in the transceiver 10, the processing procedure up to generate the PN code PN1 by the PN code generator 20 of the code decoding part 13 will be described with reference to a flow chart of FIG. 5. The transceiver 10, entering from the starting step RT1, moves to step SP1.

At step SP1, when the CPU 16 of the protocol part 11 identifies that the power source is turned on or is reset, it moves to the following step SP2. At step SP2, the CPU 16, reading out the system ID from the IC card via the card interface 12, moves to step SP3.

At step SP3, the CPU 16 temporarily stores the bit data of the system ID read out from the IC card in the memory 17 as the initial value for generating the PN code PN1 and moves to step SP4.

At step SP4, the CPU 16, storing the bit data of the system ID read out from the memory 17 in the DFFs 31 to 34 of the PN code generator 20 as the initial value as it is, terminates the initial setting and moves to the following step SP5.

At step SP5, after transferring the bit data stored in the DFFs 31 to 34 of the PN code generator 20 as the initial value to DFFs 35 to 38, the CPU 16 sequentially shifts the bit data based on the reference clock CLK and sequentially outputs the PN code PN1 formed by applying the exclusive OR arithmetic operation one bit by one bit and moves to the next step SP6.

At step SP6, the CPU 16 judges with the counter 21 whether the number of shifts of the PN code generator 20 reaches, the specified fifteen times. At this point, if a negative result is obtained, this means that the number of shifts of the PN code generator 20 has not reached the specified fifteen times, i.e., the PN code PN1 has not been outputted for one cycle of 15-bit, and at this time, the CPU 16 returns to step SP5 again and repeats the processing described above until the time when the number of shifts reaches the specified fifteen times.

On the other hand, if an affirmative result is obtained at step SP6, this means that the number of shifts of the PN code generator 20 reaches the specified fifteen times, i.e., the PN code PN1 has been outputted for one cycle of fifteen bits, and at this time, the CPU 16 moves to the following step SP7.

At step SP7, the CPU 16 confirms that it terminates the output of the PN code PN1 for one cycle of fifteen bits to the packet data forming section 22 and the packet data separating section 23 and moves to the following step SP8 to terminates the processing.

Figure 6:
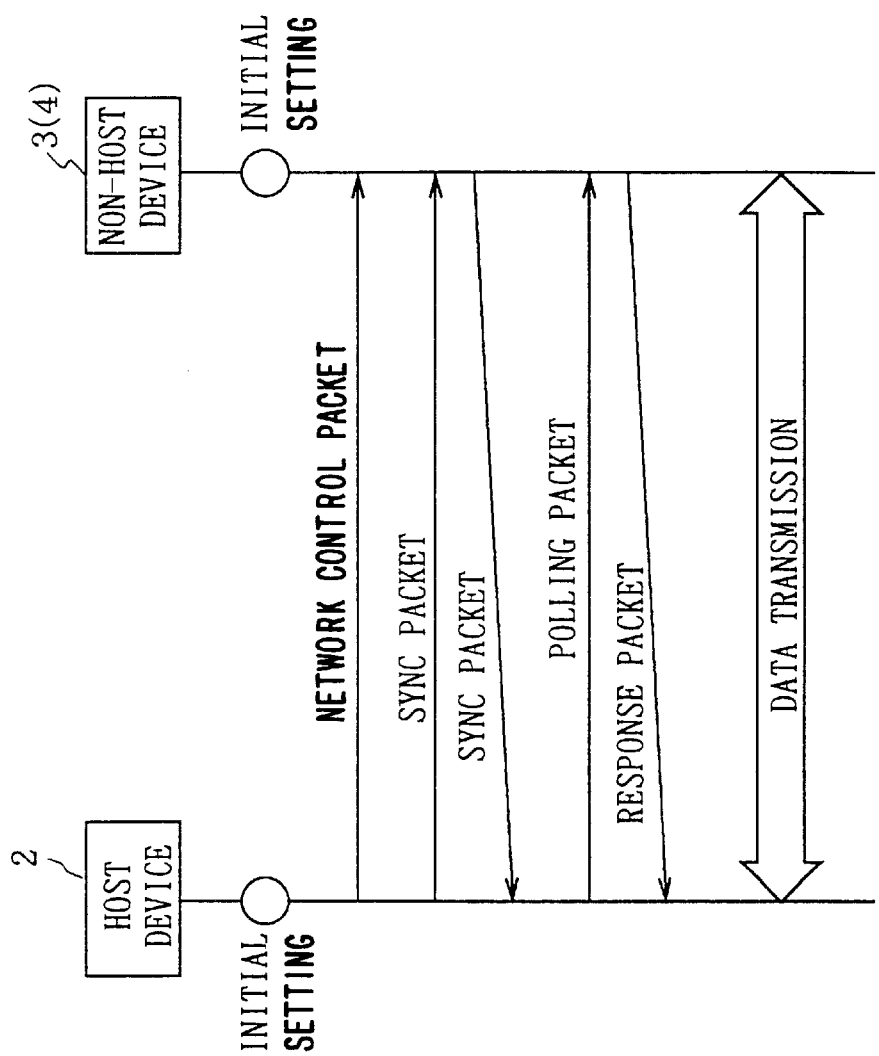
FIG. 6 is a brief linear diagram showing the communication control procedure in the radio transmission system.

Then, the communication control procedure up to transmit the data between the host device 2 and the non-host device 3 or 4 in the radio transmission system 1 will be described referring to FIG. 6. In this radio transmission system 1, when the power source is turned on, the host device 2 and non-host devices 3 and 4, conducting the processing of the above steps SP1 to SP4, terminate the initial setting respectively.

Next, the host device 2 firstly transmits the control data containing system information and the like, in order to exchange data between the non-host device 3 and 4. In this case, by adding PN code PN1 to the head of the control data, the host device forms the network control packet and transmits this to non-host devices 3 and 4.

In the non-host devices 3 and 4, this packet determines the communication channels of the prescribed frequency to be used for communicating with the host device 2 respectively. Thereafter, these non-host devices 3 and 4 transmit data to the host device 2 via this communication channel.

Accordingly, when the communication channel is determined, the host device 2 forms sync packet data in order to synchronize in the system with the non-host devices 3 and 4, and transmits this to the non-host devices 3 and 4.

The non-host devices 3 and 4, after confirming synchronization based on the sync packet data transmitted from the host device 2, send back the sync packet data to the host device 2. The host device 2 confirms that synchronization is taken in the system by receiving the sync packet data sent back from the non-host devices 3 and 4.

Then, the host device 2 forms polling packet data by adding the PN code PN1 to the polling data in order to confirm whether the non-host device 3 or 4 wants the access right to transmit the data to the host device 2, and transmits this to the non-host devices 3 and 4 in order.

In the case where the non-host devices 3 and 4 desire the access rights, they, after receiving the polling packet data, form response packet data by adding the PN code PN1 to the response data showing the acquisition of access rights and send this back to the host device 2.

Thus, when the host device 2 receives the response packet data from the non-host device 4 for example, it gives priority to the non-host device to transmit data via a prescribed frequency channel. For example, the host device 2 starts exchanging the transmission packet data D3 and receiving packet data D4 formed of such as image data with the non-host device 4.

According to the foregoing construction, the transceivers 10 mounted in the host device 2 and the non-host devices 3 and 4 of the radio transmission system 1 form the transmission packet data D3 by adding the PN code PN1, which is generated by using the system ID read out from the IC card at the time of transmitting data as the initial value, to the head of data sequence to be transmitted, converts this into the transmission signal S14 and transmits this.

Furthermore, the transceiver 10, converting the received signal S15 when received the data, takes out the received packet data D4 and compares the PN code added to the head of the received packet data D4 with the PN code PN1 supplied from the PN code generator 20. And if these bit data match, it certifies that the data is transmitted from the non-host device 3 or 4 in the same system, and at this time, the transceiver 10 separates the received packet data D4 into the PN code PN1 and the coded data D5 and decodes the coded data D5.

Thus, in the transceiver 10, since a specific system ID for the radio transmission system 1 is used as the initial value to generate the PN code PN1, the PN code PN1 generated by the PN code generator 20 can be used as the specific PN code for each system for certification.

Accordingly, in the radio transmission system 1, in the case where the host device 2 converts the transmission packet data D3 generated by adding the PN code PN1 to the head of the coded data D2 into the transmission signal S14 and transmits this to the non-host device 3 for example, the non-host device 3 can conduct the certification easily by conducting the simple process of just comparing the PN code of the received packet data D4 obtained by converting the received signal S15 with the PN code PN1 generated by the PN code generator 20, and thus, the processing time required for certification can be shortened.

Furthermore, at this point, as the transceiver 10, just providing a counter 21 to count the number of shifts newly to the PN code generator 20, the PN code PN1 with a desired bit rate (fifteen bits) can be formed and the circuit construction can be simplified and mini-sized.

Moreover, in the radio transmission system 1, the transmitting side transmits the transmission packet data D3 in which the PN code PN1 generated based on the specific system ID is added to the coded data D2, and the receiving side compares the PN code added to the received packet data D4 with the PN code PN1 supplied from the PN code generator 20 for certification. Thereby, the PN code specific to the other system has been added to the data transmitted from the non-host device of another system, so that the interference between two different systems can be prevented and the system data can be also prevented from being tapped by the user of another system and thus, this can serve to prevent the violation of privacy.

Furthermore, since the radio transmission system 1 conducts the certification using the PN code PN1 formed based on the system-specific system ID, it becomes unnecessary to adopt the encryption system that is prohibited from export as before and the problem caused by export controls can be solved.

According to the above constitution, in the radio transmission system 1, the transceiver 10 mounted in each of the host device 2 and the non-host devices 3 and 4 transmits the transmission packet data D3 after adding the PN code PN1 to the coded data D2 at the time of transmission, and compares the PN code of the received packet data D4 with the PN code PN1 supplied from the PN code generator 20 at the time of reception. Thereby, the certification can be conducted only by simple comparing processing and further, the interference due to transmission data from a non-host device of another system and the tapping by a user in another system can be prevented.

Note that, in the above embodiment, 4-bit bit data is used as the system-specific system ID. However, the present invention is not only limited to this but also the system ID of various other bit number corresponding to the number of registers DDFs 35 to 38 forming the PN code generator 20 can be used.

Further, in the above-mentioned embodiment, the M-sequence code is used as the PN code PN1 to be formed by the PN code generator 20. However, the present invention is not only limited to this but also, in short, if the code sequence is the system-specific code sequence not interfering between systems, various other code sequences such as gold code sequence can be used.

Furthermore, in the above-mentioned embodiment, 4-bit bit data is used as the initial value. However, the present invention is not only limited to this but also FEC (forward error correction) redundant bits calculated by the prescribed arithmetic operation based on the 64-bit system ID can be used as the initial value in the case where the system ID is formed with sixty-four bits. In this case, the PN code generator 20 forms PN code by using the same number of DDFs as the number of bits of the redundant bit, and the FEC redundant bit is computed based on the system-specific system ID, so that the PN code generated becomes specific for each system and interference between systems does not occur.

Moreover, in the above-mentioned embodiment, the PN code PN1 is generated by the PN code generator 20 based on the system-specific system ID read out from the IC card through the card interface 12. However, the present invention is not only limited to this but also the PN code PN1 can be formed by previously memorizing the system-specific system ID in the memory 17 and reading it out from that memory.

Furthermore, in the above-mentioned embodiment, the transceiver 10 is constructed as the signal receiving device by an antenna 15 and a RF converter 14 as the code extracting means for receiving the transmission signal S14 formed by applying the prescribed transmission processing to the transmission packet data D3 added to the coded data D2 in which the transmission data D1 to transmit the PN code PN1 as the code sequence with the prescribed bit length formed based on the system ID as the prescribed identification data and for extracting the PN code PN1 from the received packet data D4 formed by applying the prescribed signal processing to said received signal S15, a PN code generator 20, a packet data separating section 23 and a CPU 16 as the comparison means for comparing the PN code PN1 allocated in advance as the code sequence of the receiving side with the PN code PN1 of the received packet data D4, and the CPU 16 and a data decoding section 25 as the control means to execute the control based on the coded data D2 of the transmission packet data D3 when the comparison result shows identity. However, the present invention is not only limited to this but also the signal receiving device can be constructed by various other code sequence extracting means, comparison means and the control means.

Furthermore, in the above-mentioned embodiment, the radio transmission system 1 according to the present invention is applied to the radio network system in the house. However, the present invention is not only limited to this but also it can be applied to various other radio LAN capable of communicating by radio between electronic devices.

According to the present invention as described above, by comparing the code sequence of the received transmission data with the code sequence allocated in advance at the receiving side, and when its comparison result shows identity, certifying it as the desired transmission data to be received, certification can be conducted certainly and rapidly only by the simple process of comparing and only when the certification is conducted, the signal receiving device capable of conducting the control of the transmission data based on the information data can be realized.

Furthermore, according to the present invention as described above, since each of multiple electronic devices transmits the transmission data formed of code sequence of the fixed bit length formed based on the prescribed identification data added to the information data to be transmitted to multiple electronic devices, compares the code sequence extracted from the data received through the receiving means with the code sequence allocated in advance at the receiving side, and when its comparison result shows identity, certifies that from which electronic device this transmission data is transmitted out of multiple electronic devices, the certification can be conducted certainly and quickly by the simple processing of just comparing. And only when the certification is executed, the radio transmission device capable of conducting the control of the transmission data based on the information data can be realized.

Furthermore, according to the present invention as described above, each of electronic devices transmits the transmission data formed of code sequence of the fixed bit length formed based on the prescribed identification data added to the information data to be transmitted to the multiple electronic devices, compares the code sequence extracted from the received data via the signal receiving means with the code sequence allocated in advance at the receiving side and when the comparison result shows identity, confirms that the received data is transmitted from which one of the plurality of electronic devices, certification can be conducted certainly and rapidly by the simple processing just to compare and only when the certification is conducted, the radio transmission method capable of executing the control of the transmission data based on the information data can be realized.

While there has been described in connection with the preferred embodiments of the invention, it will be obvious to shows skilled in the art that various changes and modifications may be aimed, therefore, to cover in the appended claims all such changes and modifications as fall within the true spirit of the invention.

What is claimed is:

1. A signal receiving device, comprising:
   code sequence extracting means for receiving transmission data including a code sequence of a fixed bit length formed based on prescribed identification data added to information data to be transmitted and for extracting said code sequence from said transmission data;
   comparison means for comparing a code sequence allocated in advance at the signal receiving device with the code sequence of said transmission data extracted by said code sequence extracting means; and
   control means for executing control of said transmission data based on said information data when a comparison result of said comparison means shows identity, wherein
   said comparison means is formed by a plurality of registers equal in number to a number of bits of said identification data, and including a shift-register for inputting bits of said identification data to said plurality of registers respectively, and for sequentially shifting each bit to an adjacent register, an exclusive OR circuit for exclusive-OR operating the bits of the identification data to be read out from each of said plurality of registers with a prescribed combination, and a counter for counting a number of shifts by said shift register, and wherein said comparison means forms the code sequence of said signal receiving device when a number of shifts reaches the predetermined number.

2. A radio transmission device for conducting data transmission between electronic devices by connecting a plurality of the electronic devices to each other by radio waves, wherein
   each of said plurality of electronic devices, comprises:
      code sequence adding means for forming a code sequence of a fixed bit length based on prescribed identification data and for adding said code sequence to information data to be transmitted;
      transmitting means for transmitting to said plurality of electronic devices transmission data formed of said code sequence added to said information data;
      code sequence extracting means for extracting said code sequence from the transmission data received at a signal receiving means;
      comparison means for comparing a code sequence allocated in advance at the signal receiving means with the code sequence extracted by said code sequence extracting means; and
      control means for confirming said data received at said signal receiving means is the transmission data transmitted from one of said plurality of electronic devices when a comparison result of said comparison means shows identity and for executing control based on said information data of said transmission data, wherein
      said code sequence adding means is formed by a plurality of registers equal in number to a number of bits of said identification data, and includes a shift register for inputting bits of said identification data to said plurality of registers, respectively, and for sequentially shifting each bit to an adjacent register, an exclusive OR circuit for exclusive-OR operating the bits of the identification data to be read out from each of said plurality of registers with a prescribed combination, and a counter to count a number of shifts by said shift register and, when the number of shifts reaches a fixed number, said code sequence adding means forms said code sequence of a fixed bit length.

3. A radio transmission method for conducting data transmission between multiple electronic devices connected to each other by radio waves, wherein
   each of said multiple electronic devices performs the steps of:
      forming a code sequence with a fixed bit length based on identification data added to the information data to be transmitted as transmission data;
      forming the transmission data of said code sequence added to said information data for transmission to said multiple electronic devices;
      extracting said code sequence from the data received via a signal receiving means at each of said multiple electronic devices;
      allocating the code sequence in advance at the signal receiving means for comparison with the code sequence of said received data; and,
      when said comparison result shows identity, confirming that said received data is the transmission data transmitted from one of the plurality of electronic devices and executing control of said transmission data based on said information data;
      inputting bits of said identification data to registers respectively by a shift-register formed by a same number of registers as a number of bits of said identification data;
      successively shifting each bit to an adjacent register;
      conducting an exclusive-OR arithmetic operation to the bit data to be read out from each register with a prescribed combination; and,
      when a number of said operations reaches a prescribed number, forming the code sequence with said fixed bit length and the code sequence of said receiving means.

* * * * *